United States Patent [19]

Di Rosa

[11] 4,393,892
[45] Jul. 19, 1983

[54] ROTARY VALVE FOR CONTROLLING THE FLOW OF A SOLID PARTICULATE MATERIAL

[75] Inventor: Gaetano Di Rosa, Pino Torinese, Italy

[73] Assignee: F.A.T.A. - Fabrica Apparecchi di Sollevamento e Trasporto ed Affini S.p.A., Turin, Italy

[21] Appl. No.: 888,791

[22] Filed: Mar. 21, 1978

[30] Foreign Application Priority Data

Jun. 3, 1977 [IT] Italy .............................. 68286 A/77

[51] Int. Cl.³ .............................................. F16K 3/36
[52] U.S. Cl. .................................. 137/242; 251/163; 251/162
[58] Field of Search ................. 137/242; 251/163, 162

[56] References Cited

U.S. PATENT DOCUMENTS

| | | | |
|---|---|---|---|
| 1,995,491 | 3/1935 | Wyukoop | 251/163 |
| 2,007,664 | 7/1935 | Shaffer | 251/163 |
| 2,306,502 | 12/1942 | Rupe | 251/163 |
| 2,501,635 | 3/1950 | Schmidt | 251/163 |
| 3,002,525 | 10/1961 | Grove | 137/242 |
| 3,395,889 | 8/1968 | Chovan | 251/163 |

Primary Examiner—Harold W. Weakley
Attorney, Agent, or Firm—Sughrue, Mion, Zinn, Macpeak and Zinn

[57] ABSTRACT

A rotary valve for controlling flow of pulverulent solids has diametrically opposed obturators carried on a rotary support and cooperating with respective valve ports in an internal circumferential surface of a cylindrical valve body, the obturators being movable radially and urged by springs against the internal surface of the valve body so as to make a good seal when the valve is closed, while permitting unobstructed flow of material when the valve is open.

3 Claims, 5 Drawing Figures

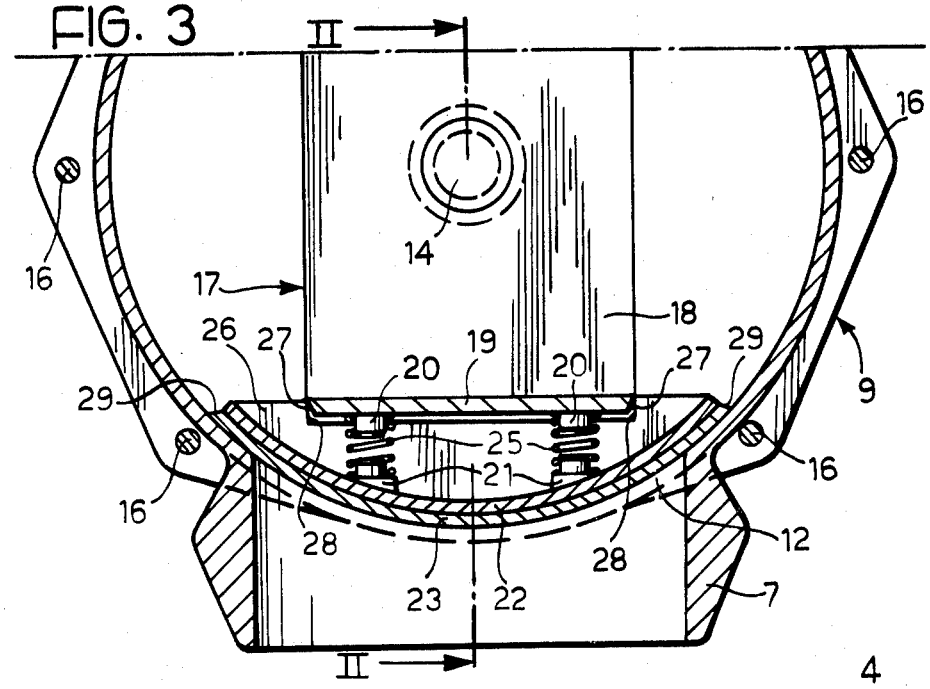
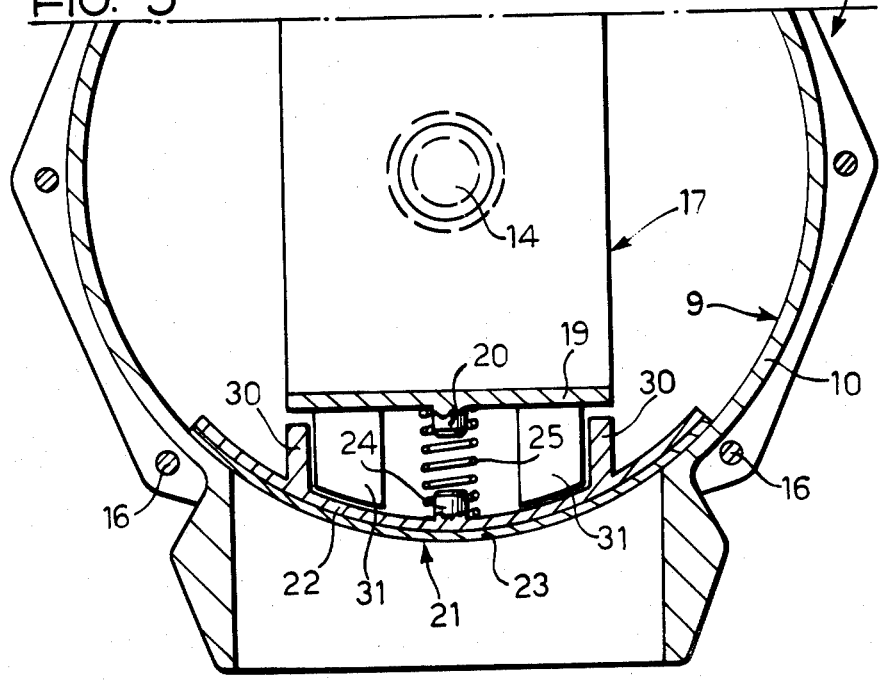

ROTARY VALVE FOR CONTROLLING THE FLOW OF A SOLID PARTICULATE MATERIAL

The present invention concerns a rotary valve for controlling the flow of a solid particulate material, comprising a hollow body having an internal circumferential surface provided with at least one valve port, and a rotatable support within the body carrying at least one obturator element cooperating with the valve port or ports. This type of valve is known, and can be used, for example, for controlling the discharge of flowing products such as pulverulent or granular materials, for example carbon black.

Such valves are usually rather large and may be manually or automatically controlled.

Pulverulent products in particular present considerable difficulties when using such a valve. Not only should the valve ensure a perfect seal in order to avoid dispensing substances which polute the working environment, but it should also be of extremely simple construction and easy to maintain using unskilled labour. Pulverulent products such as carbon black, however, contain very fine particles which require almost perfect sealing when the valve is closed, and which also have a tendency to take the form of a solid mass attached to one wall of the valve, which prevents the valve from making a good seal.

The object of the present invention is to provide a valve of the aforesaid type which can make a good seal even for products which have a tendency to take the form of solid masses attached to the walls of the valve, without any severe constructional or maintenance problems.

According to the present invention there is provided a rotary valve for controlling the flow of a solid particulate material, comprising a hollow body having an internal circumferential surface provided with at least one valve port, and a rotatable support within the body carrying at least one obturator element cooperating with the valve port or ports, the valve having at least one of the following three combinations of characteristic features:

(i) There is between the support the or each obturator element a radial clearance so that the or each obturator element can move radially relative to the support, and resilient means comprising at least one spring are provided for urging the or each obturator element radially outwardly relative to the support and against the internal circumferential surface of the valve body. By this means the size of the spring or springs can be chosen so as to apply to the or each obturator element a predetermined radial force for the specific practical application of the valve, both for effecting proper closure of the valve and for scraping off deposits of solid material from the internal circumferential surface of the valve body. By having the obturator element capable of free movement radially relative to the support removal of the obturator element for changing it or polishing it is facilitated.

(ii) The body of the valve has two diametrically opposed valve ports in its internal circumferential surface, and the support carries two diametrically opposed obturator elements each of which is movable radially relative to the support and relative to the other obturator element, and resilient means are provided for urging each obturator element radially outwardly relative to the support and against the internal circumferential surface of the valve body. The combination of the effect of the elastic means and the two obturator elements gives a good seal. The upstream obturator element is sufficient in itself to prevent the escape of material; the downstream obturator element constitutes an insurance against the escape of any material which might succeed in filtering through the upstream obturator element.

(iii) The or each obturator element is movable radially relative to the support and there are provided resilient means urging the or each obturator element radially outwardly relative to the support and against the internal circumferential surface of the valve body, the support having a bearing surface which engages a cooperating bearing surface on the obturator element for moving the latter circumferentially relative to the body for the purpose of closing the associated valve port at least one of the said bearing surfaces being inclined to the other bearing surface so that in the course of closing of the valve, the support applies to the obturator element a direct force in the radially outward direction, so as to augment the radial force of the resilient means. In this way the force of the resilient means is augmented only during the movement of the obturator element. In a preferred embodiment, the bearing surfaces in the course of closing the valve port, apply the said radial force to the leading edge but not to the trailing edge of the or each obturator element. Since the leading edge serves the purpose of scraping off deposits of solid material attached to the internal circumferential surfaces of the body, the bearing surfaces apply the force only to the leading part of the or each obturator element without increasing excessively the friction and therefore the resistance to movement of the support.

The invention will further be described, by way of non-limiting example, with reference to the accompanying drawings, in which:

FIG. 3 is a cross section of the lower part of the valve, taken along the line III—III of FIG. 2;

FIG. 5 is a vertical section corresponding to FIG. 3 of the lower part of a valve according to a second embodiment of the invention.

Figure 1:
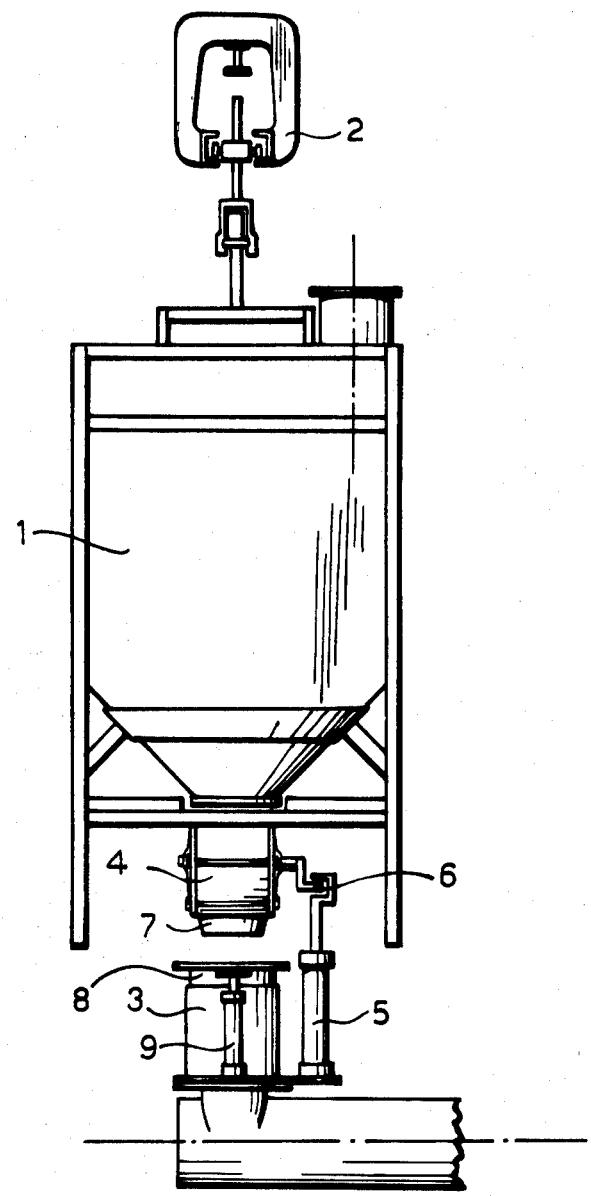
FIG. 1 is a diagramatic side elevation view of a plant for conveying a powdery product, specifically carbon black, for example in a factory for the manufacture of vehicle tyres, the plant incorporating a valve according to the invention.

FIG. 1 illustrates a load carrying container 1 carried by a conventional overhead conveyor 2 for feeding the pulverulent material, in this case carbon black, to an inlet 3 of a utilization plant for the material. Below the container 1 there is a valve 4 according to the invention operable by a pneumatic actuator 5 which engages an operating lever 6 connected to a movable obturator of the valve 4.

The valve 4 has a downwardly projecting outlet pipe 7 which tapers in cross section to its outlet end. The inlet 3 of the utilization plant has an internally convergent sleeve movable vertically by means of two pneumatic actuators 9. In order to achieve a good seal between the outlet 7 and the inlet 3, the pneumatic actuators 9 lift the sleeve 8 so as to bring its internal surface into close-fitting engagement with the tapered external surface of the outlet pipe 7.

The first embodiment of the valve 4 (FIGS. 2 to 4) has a hollow cylindrical body 9 the axis of which is horizontal, including a circumferential part 10 which has an upper annular flange 11 by means of which the valve body 9 is fixed to the outlet pipe 7.

The upper and lower parts of the circumferential surface of the part 10 are provided with two diametrically opposed valve ports or apertures 12 sharing a common vertical axis. The body 9 also has two end cover plates 13 which constitute opposite radial sides of the cylindrical body 9 and which support two coaxial control shafts 14, rotatable in respective seals 15 in the cover plates 13. The cover plates 13 are releasably fixed to the body 9 by means of bolts 16.

The shafts 14 carry a rotatable support within the body 9. The support is in the form of a four-sided support frame 17 having two opposite rectangular sides 18 close to the inner radial surfaces of the end cover plates 13 and fixed by welding to the respective shafts 14, and two rectangular sides 19, close to the internal cylindrical surface of the body 9, so arranged that the solid pulverulent material can pass through the support frame 17 when the valve 4 is open, that is when the sides 18 and 19 are disposed in vertical planes. Four studs 20 are attached to the external surface of each side 19, near the four corners of the latter.

The support frame 17 bears two identical sector-shaped obturator elements 21 arranged diametrically opposite each other for closing the two diametrically opposed ports 12. Each obturator element 21 comprises a curved part-cylindrical plate 22 covered with a lining 23 of antifriction or self-lubricating plastics material.

Between the support frame 17 and each obturator element 21 there is a radial clearance so that the obturator element 21 can move radially relative to the support frame 17. Four studs 24, coaxial with the respective studs 20, are fixed to the internal surface of each plate 22. The obturator element 21 is urged radially outwardly relative to the support frame 17 and into contact with the internal circumferential surface of the cylindrical body 9 by resilient means in the form of helical springs 25 fitted to the aligned pairs of studs 20 and 24.

Each plate 22 is provided internally with a chordal bearing member 26 having a central notch into which there fits the adjacent side 19 of the support frame 17, for the purpose of guiding the radial movement of the obturator element 21 relative to the support frame 17 and of transmitting circumferential movement to the obturator element 21 upon rotation of the support frame 17 about the axis of the shafts 14. For this purpose the side 19 has opposite bearing surfaces 27 and the central notch of the bearing member 26 has two cooperating surfaces 28. If all the surfaces 27, 28 were orthogonal to the plane of the side 19, the support frame 17 would exert upon the obturator element 21, upon rotation of the frame, a force in a chordal direction with a line of action substantially spaced from the tangent to the external surface of the obturator element 21 parallel to the chordal direction. The line of action of the chordal force passes close to the leading transverse edge of the obturator element 21, and this chordal force would thus augment the radial force of the springs 25 at the leading edge and not at the trailing edge of the obturator element 21 during circumferential movement of the latter.

This effect can be increased if at least one surface of each of the cooperating pairs of surfaces 27, 28 is chamfered or inclined to the plane of the side 19. It will be seen from FIG. 3 that the surfaces 27 are inclined to the plane of the side 19 in generally opposite directions. In FIG. 3 the inclination of each surface 27 to the plane of the side 19 that is, the chordal direction, is about 70°, but this inclination may be widely varied according to the design of the valve. In this way the obturator elements 21 are connected to the support frame 17 so as to follow the angular movements of the latter, while remaining free to effect radial movements relative to the support frame in order to take up any clearances. In order to enhance the scraping of solid material from the internal circumferential surfaces of the body 9, at least one circumferential edge 29 of each obturator element 21 may be chamfered.

In operation of the valve 4, one of the shafts 14 is rotated through 90° to open the valve 4 and through 90° in the opposite direction to close the valve 4.

For maintenance, the cover plates 13 can easily be removed and the support frame 17 withdrawn in the axial direction, after which the obturator elements 21 can be freely detached from the support frame 17.

The interior of the body 9 is thus fully accessible for the purpose of checking it and removing any accretions of solid material from its internal surfaces.

Figure 2:
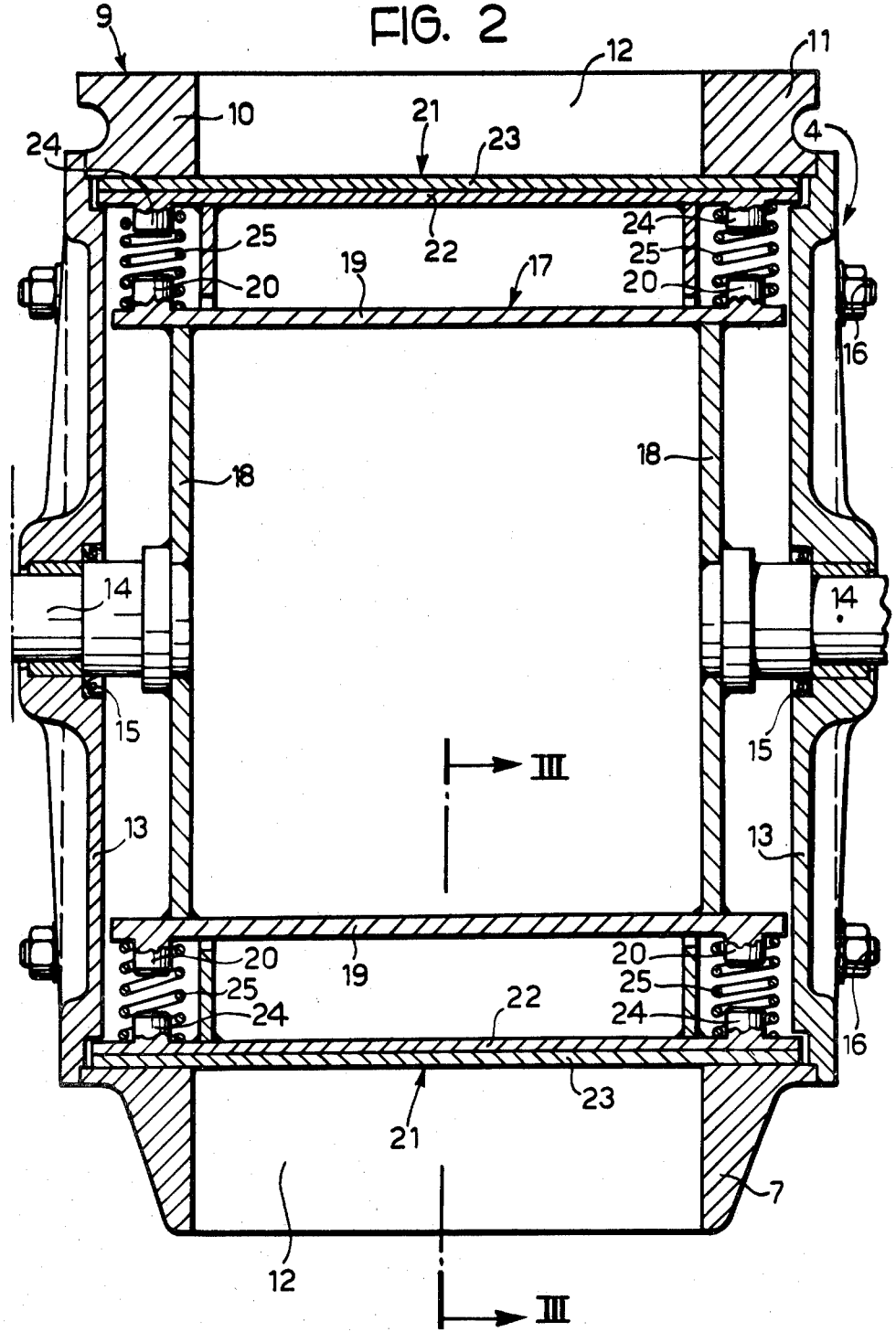
FIG. 2 is a vertical cross section, on an enlarged scale, of the valve according to one embodiment of the invention taken along the line II—II of FIG. 3.
Figure 4:
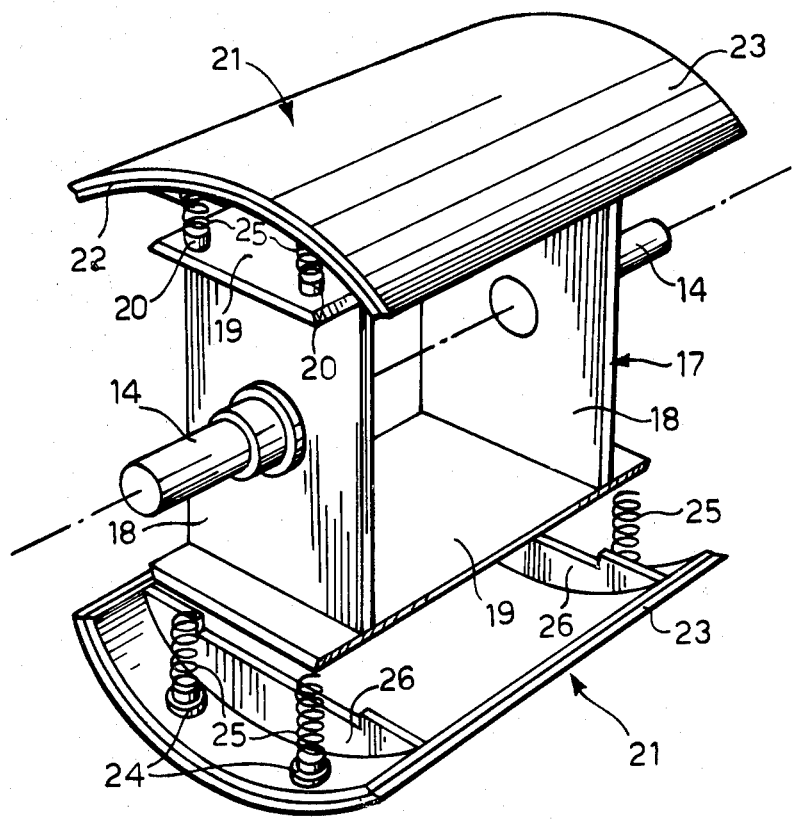
FIG. 4 shows in perspective the support and the obturator element of the valve shown in FIGS. 2 and 3.

In the second embodiment shown in FIG. 5, the same reference numerals have been used to designate those parts which are similar or identical to those of the embodiment of FIGS. 2 to 4. The plate 22 of each obturator element 21 has in this embodiment a radius slightly greater than the radius of the internal circumferential surface of the body 9; for example, the difference between the two radii may be equal to the thickness of the lining 23 of plastics material. The springs 25 engage the central part of each obturator element 21, shown in cross section in FIG. 5, and the said central part of the obturator element 21 flexes to engage the internal circumferential surface of the body 9 and to make a firm seal therewith in the closed position of the obturator element 21. In this way the springs 25 apply to the circumferential edges of the obturator element 21 a force substantially greater than the force applied to the central part of the obturator element 21. In order to permit flexing of the obturator element 21, the chordal member 26 of the embodiment of FIGS. 2 to 4 is dispensed with and the obturator element 21 is guided relative to the support frame 17 by means of two ribs 30 which engage, with a small clearance, two cooperating projecting members 31 fixed to the outside of the respective side 19 of the support frame 17.

It will be appreciated that details of the operation and construction of the valve may be widely varied, while remaining within the scope of the present invention. For example, in one variant, the two shafts 14 may be replaced by a single shaft which passes through the space within the support frame 17.

What is claimed is:

1. A rotary valve for controlling the flow of a solid particulate material comprising a hollow body having an internal circumferential surface provided with two diametrically opposed valve ports, a rotatable support disposed within said body, two diametrically opposed obturator elements carried by said rotatable support and cooperating with said valve ports, each obturator being movable radially relative to said support and relative to the other obturator element, and resilient means disposed between said support and each obturator element for urging each obturator element radially outwardly relative to said support and against said internal circumferential surface of the valve body, said body having internal end surfaces perpendicular to said circumferential surface, said support being in the form of said rectalinear frame having two sidewalls adjacent the internal end surfaces of said body, at least one of said sidewalls being fixed to a drive shaft, said frame having two additional sidewalls adjacent the internal circumferential surface of the body so that solid material will pass through the rectalinear frame when the valve is open, each obturator element having a bearing surface cooperating with a bearing surface on the support for the purpose of moving said obturator element circumferentially upon closure of the associated valve port with said bearing surfaces being inclined to each other in such a way that upon closure of the valve the support applies to each obturator element a direct radially outward force in order to augment the radial force of the resilient means.

2. A valve according to claim 1, in which the said bearing surfaces in the course of closure of the valve ports apply the said radial force to the leading edge but not to the trailing edge of the obturator elements.

3. A valve according to claim 2, in which there are two said bearing surfaces on the support cooperating with two corresponding bearing surfaces on each obturator element, and the relative inclinations of the two cooperating pairs of bearing surfaces on the support and on each obturator element are in opposite general directions so that the support applies the said radial force to the leading edge of each obturator element in either direction of rotation of the support.

* * * * *